(No Model.) 3 Sheets—Sheet 1.

A. GREENWOOD.
COAL CUTTING MACHINE.

No. 521,263. Patented June 12, 1894.

(No Model.)   3 Sheets—Sheet 3.

A. GREENWOOD.
COAL CUTTING MACHINE.

No. 521,263.   Patented June 12, 1894.

Witnesses:
J. M. Borst
W. H. Kennedy

Inventor:
Arthur Greenwood
By Philipp Munson & Phelps
Attys.

UNITED STATES PATENT OFFICE.

ARTHUR GREENWOOD, OF LEEDS, ENGLAND.

COAL-CUTTING MACHINE.

SPECIFICATION forming part of Letters Patent No. 521,263, dated June 12, 1894.

Application filed April 20, 1893. Serial No. 471,152. (No model.)

*To all whom it may concern:*

Be it known that I, ARTHUR GREENWOOD, of Leeds, in the county of York, England, have invented certain new and useful Improvements in Coal-Cutting Machines, of which the following is a specification.

This invention relates to coal cutting machines to be used in mines consisting of a motor and a rotating cutting bar mounted on a carriage, which is traveled into working position.

The object of my invention is to provide, in addition to the swiveling motion of the motor and cutter upon the carriage, which is usual, in order to allow of the cutter being "wiped" into a seam of coal, other adjustments which will permit of the working path of the cutter being raised or lowered, or set on an incline, so as to follow more readily the seam being cut.

In carrying out my invention, I inclose the motor centrally within a metal casing, which casing also supports, on a different line, the cutter spindle, the motor and the cutter being geared together within the casing by suitably proportioned gearing. This casing, at a part where it is circular in cross section, is embraced by a steel ring, having trunnions thereon, which rest in bearings carried by brackets upstanding from a swiveling bed plate supported by the traveling carriage of the machine.

Figure 1:
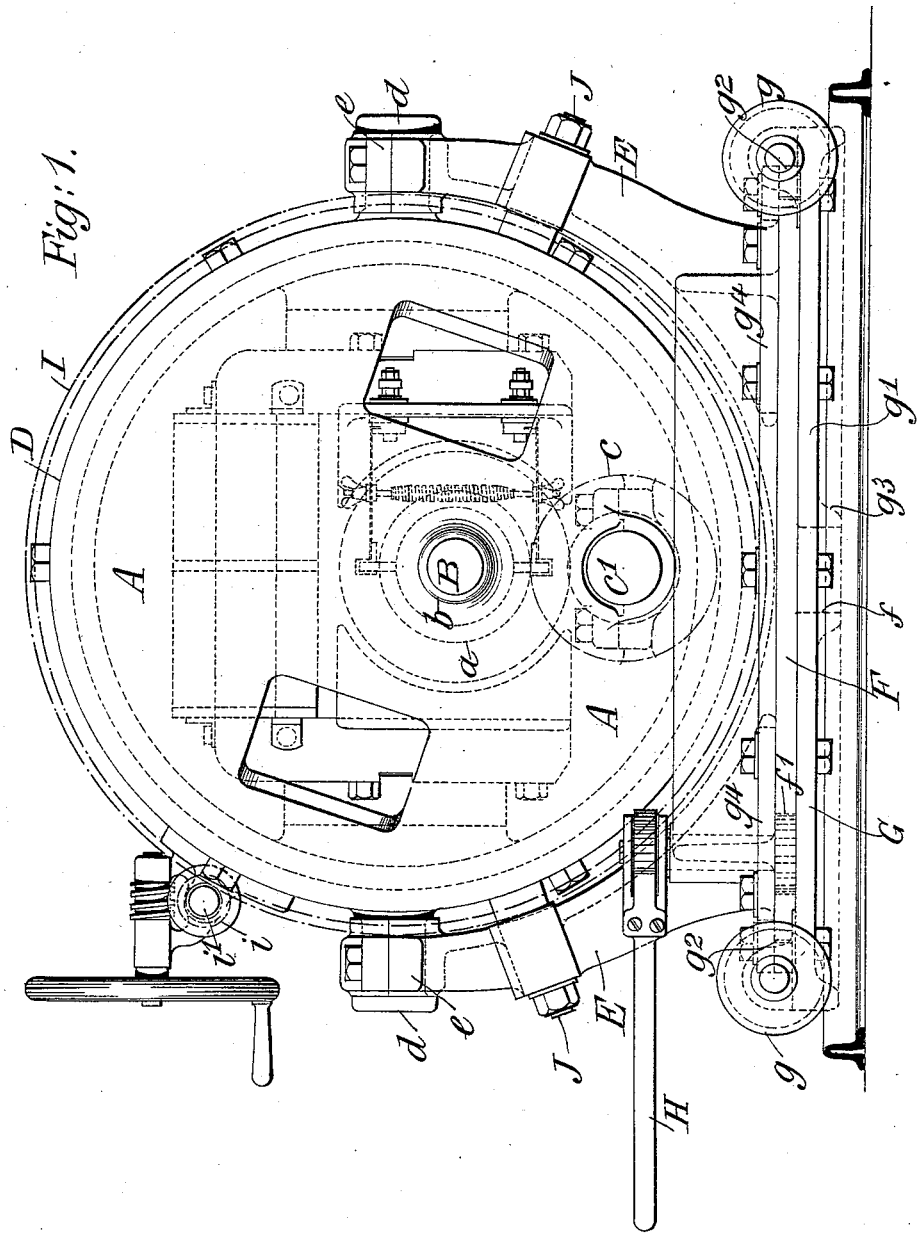
Figure 2:
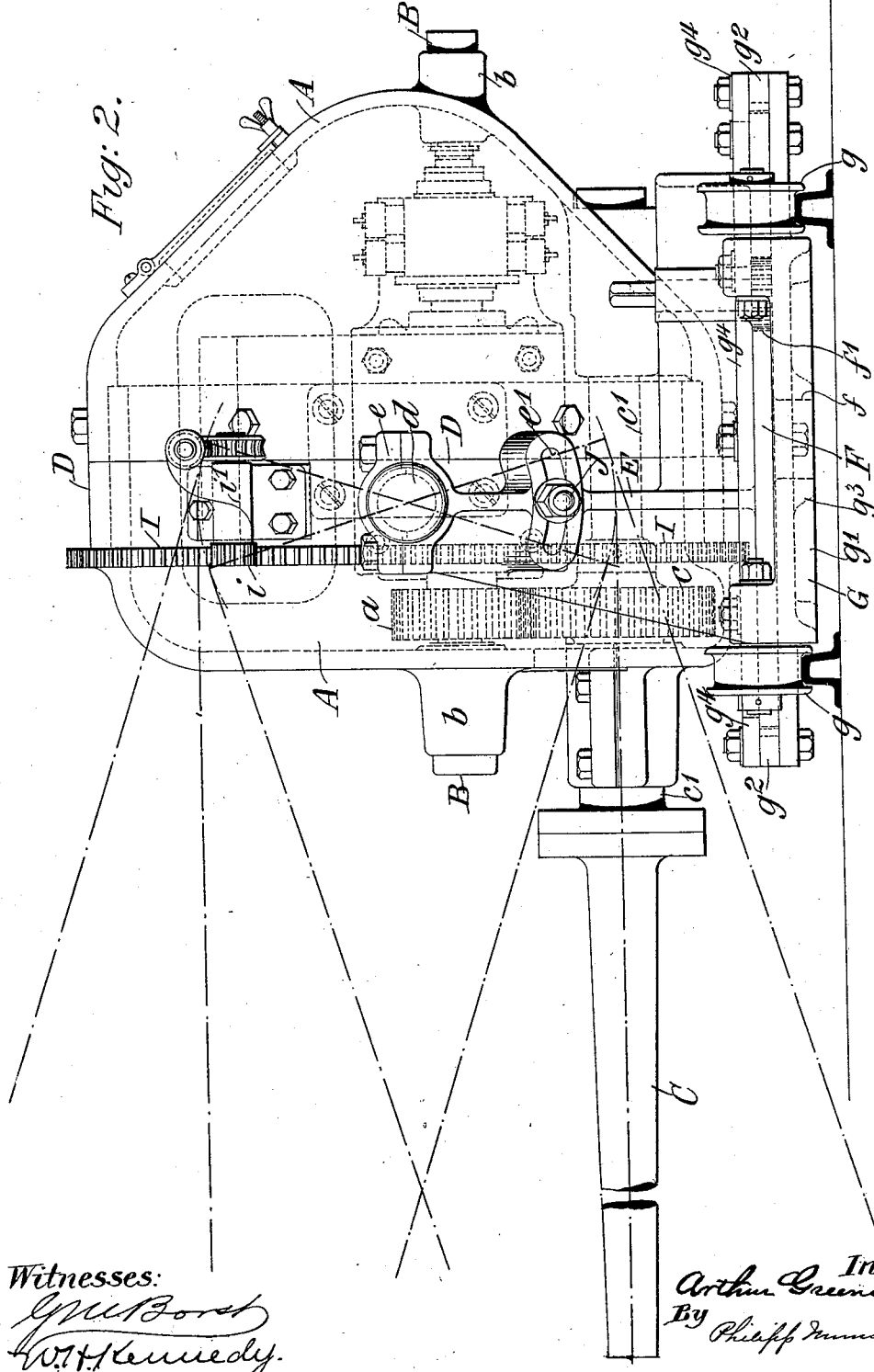
Figure 3:
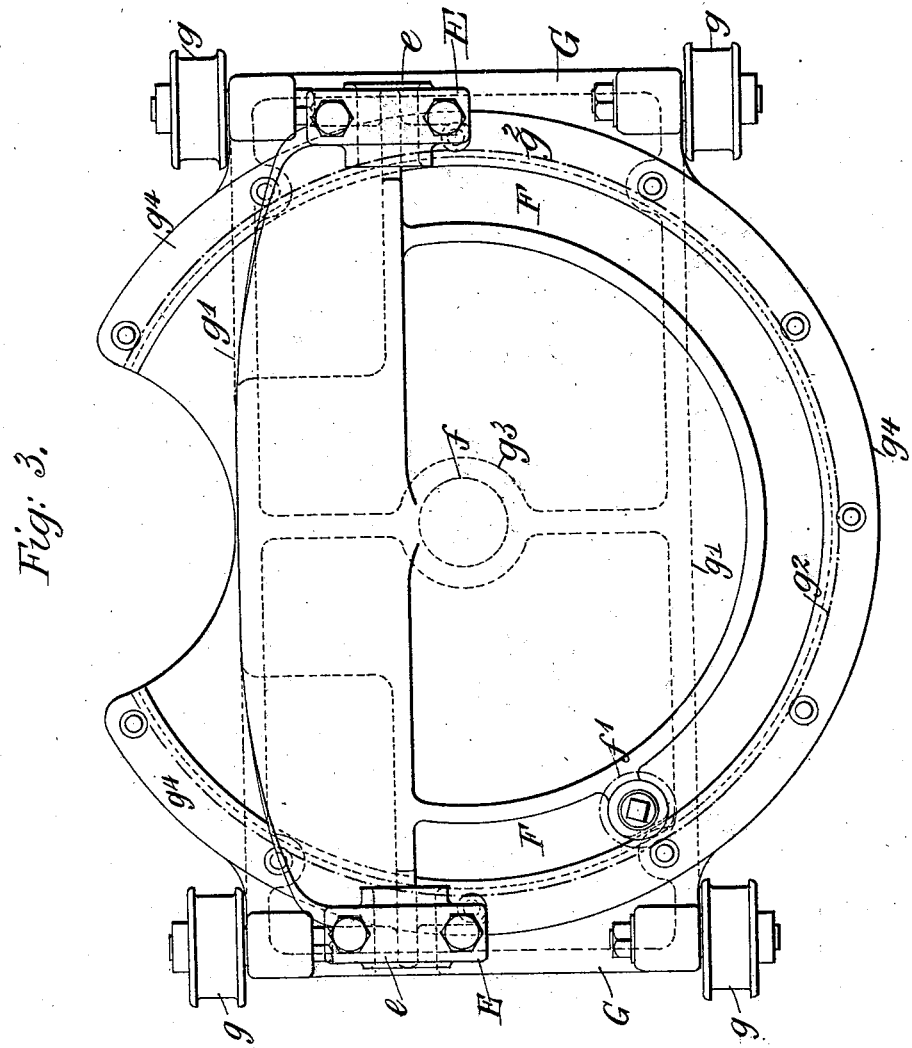

In the accompanying drawings, Figure 1 is an end elevation of a machine for cutting coal, embodying my invention. Fig. 2 is a side elevation thereof; and Fig. 3 is a plan view of the carriage.

In Figs. 1 and 2, the motor which I have indicated, is an electrical motor mounted upon the spindle B, extending across the casing A, and capable of rotation in bearings $b. b.$ $a$ is a steel wheel fast on the motor spindle, having teeth in permanent engagement with the toothed wheel $c$, fast on the spindle $c'$ of the cutter C.

D is a steel hoop or ring, which embraces the casing A at a part where the latter is circular in cross section.

$d. d$ are a pair of trunnions fixed upon the ring D, and resting in the bearings $e. e$ of the brackets E E, which brackets stand upon the swiveling bed plate F, supported by the under carriage G. The carriage G, which is provided with a set of wheels $g$, to run on rails laid up to the position where the machine is required to work, consists of a rectangular frame $g'$. and a circular portion or ring $g^2$. bolted thereon, and provided with teeth on its inner circumference.

$g^3$. is a socket formed in a cross piece carried by the frame $g'$., central to the circular portion $g^2$. Into this socket is dropped the pivot $f$. of the circular swiveling bed plate F, which supports the cutting machine proper. Near the circumference of the plate F, there is mounted a pinion $f'$., which engages with the internal teeth of the ring $g^2$.

$g^4$. is a circular strip bolted upon the ring $g^2$, and overlying the periphery of the bed plate F, so as to keep the latter firmly in place. To rotate the swiveling bed plate F on a vertical axis, and with it the casing A, and all the parts contained therein, or carried thereby, a ratchet wheel is provided on the spindle of the pinion $f'$, and a lever H, best seen in Fig. 1.

I is a rack upon the circumference of the casing A, by means of which the latter is rotated within the ring D. In engagement with the said rack, is a pinion $i$, fast on a spindle $i'$, which turns in a bearing carried by the ring D. The spindle $i'$. also carries a worm wheel in engagement with a worm worked by a hand motion, also mounted on the ring D; movement for the machine being thus provided on both vertical and horizontal axes. The cutter may be turned or "wiped" into a seam of coal at any desired level within the limits of the height of the machine. To give, however, an additional adjustment diagonally, or on an incline, the trunnions $d. d.$ of the ring D are called into play, so as to tilt the casing bodily in its supporting brackets E E, and cant the cutter bar up or down, no matter what position, as to height, it at the moment occupies. To fix the casing at the required tilted position, bolts J are provided on the ring D, and curved slots $e'. e'$ in the brackets E E, so that, by means of nuts, the ring may be set as desired. A portion of the swiveling bed plate F is cut away (see Fig. 3), to give full scope to the downward movement of the cutter bar.

It will thus be seen, that the cutter spindle is mounted upon what is practically a universal joint. The swiveling bed plate gives any desired sweep on a vertical axis. The movement of the ring which supports the casing upon its trunnions, will cant the said casing, and with it the motor and cutter spindle, to an inclined position up or down, and the working level of the cutter is changed by rotating the casing within its ring, and thereby moving the cutter spindle around the motor axis.

I claim—

1. In a machine for cutting coal and other minerals, the combination with a carriage or base support, of a bed plate swiveled to the latter to rotate on a vertical axis, a frame or hoop trunnioned in the bed plate, a casing embraced by said frame or hoop and adapted to rotate therein on a horizontal axis, cutting mechanism mounted in the casing, a motor also mounted therein, and connections between the motor and cutting mechanism, substantially as described.

2. In a machine for cutting coal and other minerals, the combination with a carriage or base support, of a bed plate swiveled to the latter to rotate on a vertical axis, a frame or hoop trunnioned in the bed plate, a casing embraced by said frame or hoop and adapted to rotate therein on a horizontal axis, cutting mechanism mounted in the casing, a motor also mounted therein, connections between the motor and cutting mechanism, and hand operated devices and connections for rotating the bed plate and casing, substantially as described.

3. The combination with the base G, of bed plate F swiveled thereto, frame or hoop D trunnioned to the bed plate, casing A embraced by the frame or hoop, cutting mechanism mounted in the casing, a motor also mounted therein, and connections between the motor and cutting mechanism, substantially as described.

4. The combination with the base G, of bed plate F swiveled thereto, frame or hoop D trunnioned to the bed plate, casing A embraced by the frame or hoop, cutting mechanism mounted in the casing, a motor also mounted therein, connections between the motor and cutting mechanism, and hand operated devices and connections for rotating the bed plate and casing, substantially as described.

ARTHUR GREENWOOD.

Witnesses:
JOSEPH FLOCKTON,
*Cashier*, 17 *Hanover Sq., Leeds.*
ALBERT E. TURPIE,
*Secretary*, 47 *St. Michael's Road, Headingly, Leeds.*